(12) United States Patent
Zhang

(10) Patent No.: US 8,909,054 B2
(45) Date of Patent: Dec. 9, 2014

(54) BI-DIRECTION OPTICAL SUB-ASSEMBLY AND OPTICAL TRANSCEIVER

(71) Applicant: Huawei Technologies Co., Ltd., Shenzhen, Guangdong (CN)

(72) Inventor: Xueming Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 127 days.

(21) Appl. No.: 13/686,001

(22) Filed: Nov. 27, 2012

(65) Prior Publication Data

US 2013/0108274 A1  May 2, 2013

Related U.S. Application Data

(63) Continuation of application No. PCT/CN2011/078572, filed on Aug. 18, 2011.

(51) Int. Cl.
*H04J 14/02* (2006.01)
*H04B 10/00* (2013.01)
*H04J 14/00* (2006.01)
*G02B 6/12* (2006.01)
*H04B 10/40* (2013.01)
*G02B 6/42* (2006.01)

(52) U.S. Cl.
CPC .............. *H04J 14/02* (2013.01); *H04B 10/40* (2013.01); *G02B 6/428* (2013.01); *G02B 6/4246* (2013.01)
USPC .............. 398/82; 398/138; 398/139; 398/70; 385/14

(58) Field of Classification Search
CPC ....... G02B 6/4246; G02B 6/428; H04B 10/40
USPC .......... 398/82, 137, 138, 139, 168, 169, 170, 398/70
See application file for complete search history.

(56) References Cited

U.S. PATENT DOCUMENTS 5,570,217 A * 10/1996 Fleuren .......................... 398/13
5,633,962 A *  5/1997 Kurata .......................... 385/24
(Continued)

FOREIGN PATENT DOCUMENTS

CN      1172254 A    2/1998
CN    201414130 Y    2/2010
(Continued)

OTHER PUBLICATIONS

Foreign Communication From a Counterpart Application, Chinese Application No. 201180001524.7, Chinese Office Action dated Jun. 28, 2013, 5 pages.

(Continued)

*Primary Examiner* — Ken Vanderpuye
*Assistant Examiner* — Abbas H Alagheband
(74) *Attorney, Agent, or Firm* — Conley Rose, P.C.; Grant Rodolph; Nicholas K. Beaulieu

(57) ABSTRACT

Embodiments of the present invention relate to a bi-direction optical sub-assembly and an optical transceiver. A transmitter in the bi-direction optical sub-assembly is configured to transmit a first communication signal or a detection signal, where the first communication signal or the detection signal is input from a first end of a first optical path and output from a second end of the first optical path, enters a second end of a third optical path through reflection of a WDM optical filter, and is input from a first end of the third optical path to an optical fiber. A second communication signal received by the optical fiber is input from the first end of the third optical path and output from the second end of the third optical path, and the second signal is received by a BOSA receiver through transmission of the WDM optical filter.

20 Claims, 3 Drawing Sheets

(56) References Cited

U.S. PATENT DOCUMENTS

| | | | |
|---|---|---|---|
| 5,642,448 A * | 6/1997 | Pan et al. | 385/31 |
| 5,754,284 A * | 5/1998 | Leblanc et al. | 356/73.1 |
| 5,771,250 A | 6/1998 | Shigehara et al. | |
| 6,868,210 B2 * | 3/2005 | Takahashi et al. | 385/50 |
| 7,341,384 B2 | 3/2008 | Chan et al. | |
| 7,492,992 B1 * | 2/2009 | Tyan et al. | 385/45 |
| 2002/0048431 A1 * | 4/2002 | Kimura | 385/47 |
| 2002/0101579 A1 * | 8/2002 | Aoki et al. | 356/73.1 |
| 2004/0175075 A1 * | 9/2004 | Takahashi et al. | 385/50 |
| 2004/0247247 A1 * | 12/2004 | Lee et al. | 385/49 |
| 2005/0100273 A1 * | 5/2005 | Kim et al. | 385/24 |
| 2005/0100275 A1 * | 5/2005 | Kimura | 385/31 |
| 2005/0123241 A1 * | 6/2005 | Margalit et al. | 385/39 |
| 2006/0029390 A1 * | 2/2006 | Schmuck et al. | 398/33 |
| 2006/0115207 A1 * | 6/2006 | Uekawa et al. | 385/14 |
| 2006/0228078 A1 * | 10/2006 | Chan et al. | 385/92 |
| 2007/0058979 A1 * | 3/2007 | Schmuck et al. | 398/135 |
| 2007/0116467 A1 | 5/2007 | Kwon et al. | |
| 2007/0154215 A1 * | 7/2007 | Zuhdi | 398/67 |
| 2007/0160322 A1 * | 7/2007 | Ide et al. | 385/24 |
| 2007/0183708 A1 * | 8/2007 | Ide et al. | 385/14 |
| 2007/0297809 A1 * | 12/2007 | Okada et al. | 398/164 |
| 2008/0165348 A1 * | 7/2008 | Kim et al. | 356/73.1 |
| 2010/0172614 A1 | 7/2010 | Oota et al. | |
| 2011/0052125 A1 * | 3/2011 | Lee et al. | 385/88 |
| 2011/0097037 A1 * | 4/2011 | Kuznia et al. | 385/33 |

FOREIGN PATENT DOCUMENTS

| | | |
|---|---|---|
| CN | 201854283 U | 6/2011 |
| EP | 1104055 A2 | 5/2001 |
| EP | 1524781 A1 | 4/2005 |
| EP | 1624593 A1 | 2/2006 |
| EP | 1763158 A1 | 3/2007 |
| JP | 2003139976 A | 5/2003 |
| TW | 200908582 A | 2/2009 |

OTHER PUBLICATIONS

Foreign Communication From a Counterpart Application, Chinese Application No. 201180001524.7, Partial English Translation of Chinese Office Action dated Jun. 28, 2013, 3 pages.

Foreign Communication From a Counterpart Application, European Application No. 11860519.5, Extended European Search Report dated Jul. 9, 2009, 5 pages.

Foreign communication from a counter-part application, PCT Application PCT/CN2011/078572, English Translation International Search Report dated May 24, 2012, 2 pages.

* cited by examiner

BI-DIRECTION OPTICAL SUB-ASSEMBLY AND OPTICAL TRANSCEIVER

CROSS-REFERENCE TO RELATED APPLICATIONS

This application is a continuation of International Application No. PCT/CN2011/078572, filed on Aug. 18, 2011, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

Embodiments of the present invention relate to the field of communications technologies, and in particular, to a bi-direction optical sub-assembly and an optical transceiver.

BACKGROUND

An optical time-domain reflectometer (OTDR) is an important device for locating a failure point of an optical fiber link in a passive optical network (PON), and the OTDR includes an optical transmitter and an optical receiver. The optical transmitter is configured to transmit an optical detection signal, where when the optical detection signal encounters an obstacle point in an optical fiber line, Fresnel reflection occurs. The optical receiver is configured to receive a Fresnel reflection signal and determine failures such as disconnection and poor connection of a link according to the size of the Fresnel reflection signal, so as to determine responsibility of a failure and exclude the failure conveniently.

An optical transceiver is a core component for transmitting and receiving a signal in a PON network. The optical transceiver is specifically classified into an optical line terminal (OLT) used in a central office end, an optical network unit (ONU), an optical network terminal (ONT), and so on. The optical transceiver is formed by a bi-direction optical sub-assembly (BOSA) and a peripheral circuit.

Since an independent OTDR device is expensive and has large volume, it is inconvenient to detect an optical transceiver such as an OLT, an ONU or an ONT in a PON network in real time.

As shown in FIG. 1, in a conventional optical transceiver A with a built-in OTDR, a partially transmitting and partially reflecting optical filter or a fused biconical taper coupler 2a is placed out of a single-fiber bi-directional BOSA 1a. A low-speed detection signal of the OTDR and a high-frequency communication signal of the BOSA are loaded together on a BOSA laser 11a inside the BOSA 1a and are output through an output end of the optical filter or the coupler 2a. A Fresnel reflection signal returned due to occurrence of Fresnel reflection when the low-speed detection signal of the OTDR encounters an obstacle in an optical fiber, after passing through the optical filter or the coupler, is received by an OTDR receiver 3a. A received high-frequency communication signal sent by another BOSA, after passing through the optical filter or the coupler 2a, is received by a BOSA receiver 12a inside the BOSA 1a. Reliability of an optical transceiver that adopts a partially transmitting and partially reflecting optical filter is relatively low, and the volume of a fused biconical taper coupler is relatively large. Therefore, a layout of a peripheral circuit 16 of a BOSA 1a in an optical module is tight, and encapsulation is difficult.

SUMMARY

Embodiments of the present invention provide a bi-direction optical sub-assembly and an optical transceiver, so as to solve problems in the prior art that a layout space of a peripheral circuit of a BOSA is small, encapsulation is difficult, and reliability is low.

An embodiment of the present invention provides a bi-direction optical sub-assembly, which is connected to an optical fiber, and includes a case body, where a transmitter, an optical time-domain reflectometer (OTDR) receiver, a bi-direction optical sub-assembly (BOSA) receiver, a wavelength division multiplexing (WDM) optical filter, and a planar lightwave circuit (PLC) are disposed in an inner cavity of the case body.

A first optical path and a second optical path are disposed on the PLC, where the first optical path and the second optical path cross to form a coupler structure, where a first end of the first optical path is connected to the transmitter, and where a second end of the first optical path is connected to the WDM optical filter. A first end of the second optical path is connected to the OTDR receiver. A third optical path is further disposed on the PLC, where a first end of the third optical path is connected to the optical fiber, and a second end of the third optical path is connected to the second end of the first optical path. The WDM optical filter is connected to the BOSA receiver.

The transmitter is configured to transmit a first communication signal or a detection signal, where the first communication signal or the detection signal is input from the first end of the first optical path and output from the second end of the first optical path, enters the second end of the third optical path through reflection of the WDM optical filter, and is input to the optical fiber from the first end of the third optical path.

A second communication signal received by the optical fiber is input from the first end of the third optical path and output from the second end of the third optical path and is received by the BOSA receiver through transmission of the WDM optical filter. A Fresnel reflection signal returned due to occurrence of Fresnel reflection when the detection signal encounters an obstacle point in the optical fiber is input from the first end of the third optical path and output from the second end of the third optical path, is input to the second end of the first optical path through reflection of the WDM optical filter, and after being output from the first end of the second optical path, is received by the OTDR receiver.

An embodiment of the present invention further provides an optical transceiver, which includes a peripheral circuit and further includes a bi-direction optical sub-assembly provided in an embodiment of the present invention.

With the bi-direction optical sub-assembly and the optical transceiver provided in the embodiments of the present invention, a transmitter that transmits a communication signal and a detection signal and a receiver that receives a communication signal and a detection signal are disposed in the bi-direction optical sub-assembly. An OTDR is integrated in a BOSA through a planar lightwave circuit PLC. Therefore, stability of the bi-direction optical sub-assembly and the optical transceiver is improved, so as to facilitate encapsulation of the optical transceiver.

BRIEF DESCRIPTION OF THE DRAWINGS

To describe the technical solutions in the embodiments of the present invention or in the prior art more clearly, the accompanying drawings required for describing the embodiments or the prior art are introduced briefly in the following. Apparently, the accompanying drawings in the following descriptions are merely some embodiments of the present invention, and persons of ordinary skill in the art may still obtain other drawings according to these accompanying drawings without creative efforts.

DETAILED DESCRIPTION

The technical solutions in the embodiments of the present invention are described in the following clearly and completely with reference to the accompanying drawings in the embodiments of the present invention. Apparently, the embodiments in the following description are merely a part rather than all of the embodiments of the present invention. Based on the embodiments of the present invention, all other embodiments obtained by persons skilled in the art without creative efforts fall within the protection scope of the present invention.

Figure 1:
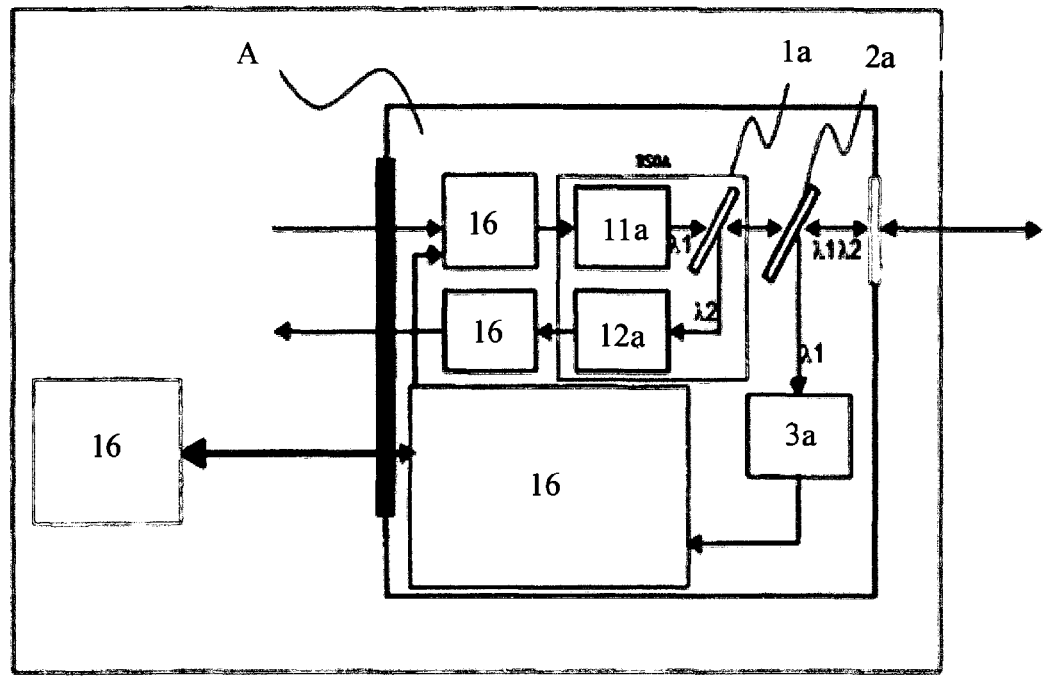
FIG. 1 is a schematic structural diagram of a conventional optical transceiver with a built-in OTDR.
Figure 2:
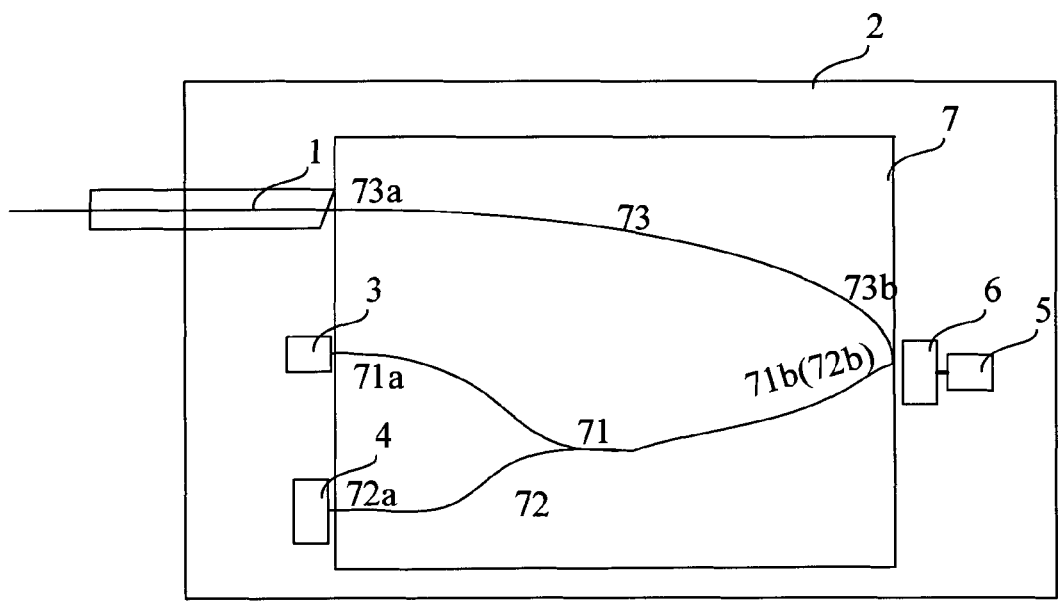
FIG. 2 is a schematic structural diagram of a bi-direction optical sub-assembly according to an embodiment of the present invention.
Figure 3:
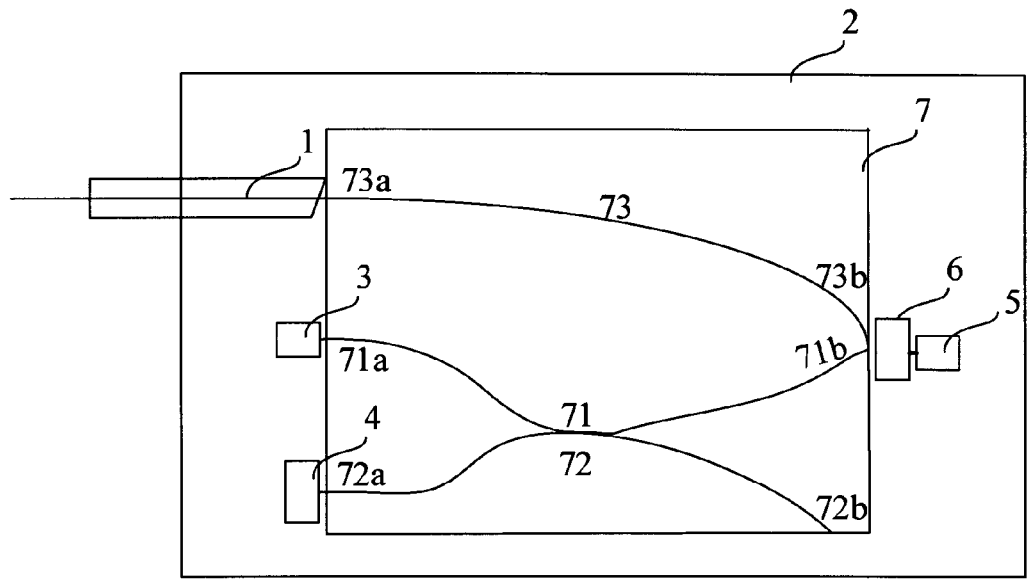
FIG. 3 is another schematic structural diagram of a bi-direction optical sub-assembly according to an embodiment of the present invention.

FIG. 2 and FIG. 3 are schematic structural diagrams of a bi-direction optical sub-assembly according to an embodiment of the present invention. As shown in FIG. 2 and FIG. 3, the bi-direction optical sub-assembly provided in this embodiment is connected to an optical fiber 1 and includes a case body 2, where a transmitter 3, an optical time-domain reflectometer (OTDR) receiver 4, a bi-direction optical sub-assembly (BOSA) receiver 5, a wavelength division multiplexing (WDM) optical filter 6, a planar lightwave circuit (PLC) 7 are disposed in an inner cavity of the case body 2.

A first optical path 71 and a second optical path 72 are disposed on the PLC 7, where the first optical path 71 and the second optical path 72 cross to form a coupler structure, a first end 71a of the first optical path 71 is connected to the transmitter 3, and a second end 71b of the first optical path 71 is connected to the WDM optical filter 6. A first end 72a of the second optical path 72 is connected to the OTDR receiver 4. A third optical path 73 is further disposed on the PLC 7, where a first end 73a of the third optical path 73 is connected to the optical fiber 1, and a second end 73b of the third optical path 73 is connected to the second end 71b of the first optical path 71. The WDM optical filter 6 is connected to the BOSA receiver 5.

The transmitter 3 is configured to transmit a first communication signal or a detection signal. The first communication signal or the detection signal is input from the first end 71a of the first optical path 71 and output from the second end 71b of the first optical path 71, enters the second end 73b of the third optical path 73 through reflection of the WDM optical filter 6, and is input to the optical fiber 1 from the first end 73a of the third optical path 73.

A second communication signal received by the optical fiber 1 is input from the first end 73a of the third optical path 73 and output from the second end 73b of the third optical path 73 and is received by the BOSA receiver 5 through transmission of the WDM optical filter 6. A Fresnel reflection signal returned due to occurrence of Fresnel reflection when the detection signal encounters an obstacle point in the optical fiber 1 is input from the first end 73a of the third optical path 73 and output from the second end 73b of the third optical path 73, is input to the second end 71b of the first optical path 71 through reflection of the WDM optical filter 6, and after being output from the first end 72a of the second optical path 72, is received by the OTDR receiver 4.

The transmitter 3 may select a device that is capable of transmitting an optical signal, such as a laser diode (LD). A signal transmitted in the BOSA is a high-frequency communication signal, while a signal transmitted in the OTDR is a low-frequency detection signal. Therefore, the transmitter 3 provided in this embodiment of the present invention is not only capable of sending a high-frequency communication signal (i.e., the first communication signal), but is also capable of transmitting a low-frequency detection signal (i.e., the detection signal). It should be noted that, when the BOSA is connected to the optical fiber 1 normally and a line of the optical fiber 1 works normally, the transmitter 3 needs to transmit only a first communication signal. When a failure occurs in the line of the optical fiber 1, the transmitter 3 may transmit a detection signal to detect and locate the failure.

If the transmitter 3 adopts an LD, a high-frequency digital current signal or a low-frequency current signal may be loaded on the LD. The LD may convert the high-frequency digital current signal or the low-frequency current signal into optical signals (i.e., a first communication signal or a detection signal) separately, and then input the optical signals to the first end 71a of the first optical path 71. Because the first optical path 71 and the second optical path 72 cross to form the coupler structure, the coupler structure is capable of outputting a signal from the first optical path 71 and the second optical path 72 according to a certain energy ratio, where the signal is input to the first optical path 71 or the second optical path 72. That is, a part of the signal input to the first optical path 71 is output from the second optical path 72, while a part of the signal input to the second optical path 72 is output from the first optical path 71.

In this embodiment provided in the present invention, in order to enable most of the first communication signal and the detection signal that are transmitted by the transmitter 3 to be output from the second end 71b of the first optical path 71 after being input from the first end 71a of the first optical path 71, it may be set that the second end 71b of the first optical path 71 and a second end 72b of the second optical path 72 coincide and form a Y-branch coupler structure (e.g., as shown in FIG. 2). If the second end 71b of the first optical path 71 and the second end 72b of the second optical path 72 do not coincide (e.g., as shown in FIG. 3), the second end 72b of the second optical path 72 may be located at the edge of the PLC 7. By setting a distance between the first optical path 71 and the second optical path 72 in a coupling area, a crossing length or coincidence length, and the thickness of a waveguide of the first optical path 71 and/or the second optical path 72, a coupler formed by the first optical path 71 and the second optical path 72 may have a proper splitting ratio. Accordingly, most of the first communication signal or the detection signal input from the first end 71a of the first optical path 71 is output from the second end 71b of the first optical path 71, and only a small part of the first communication signal or the detection signal is output from the second end 72b of the second optical path 72.

Bi-direction optical sub-assemblies (BOSAs) are usually used in pairs, that is, each of two ends of an optical fiber may be connected to one BOSA, and in two BOSAs used in pairs, a communication signal transmitted by a transmitter 3 in each BOSA has a different wavelength. The WDM optical filter 6 provided in this embodiment of the present invention has a reflection effect on a first communication signal transmitted by a local transmitter 3 and a detection signal transmitted by the transmitter 3, but has a transmission effect on light of a wavelength of the second communication signal received by the optical fiber 1. Therefore, light output from the second end 71b of the first optical path 71 enters the second end 73b of the third optical path 73 under a reflection effect of the WDM optical filter 6 and enters the optical fiber 1 through the first end 73a of the third optical path 73.

A second communication signal that is transmitted by another BOSA and is received from the optical fiber 1 enters a local BOSA from the first end 73a of the third optical path 73. After the second communication signal is output from the second end 73b of the third optical path 73, because the WDM optical filter 6 has a transmission effect on a wavelength of the second communication signal, the second communication signal is received by the BOSA receiver 5 through transmission of the WDM optical filter 6. The BOSA receiver 5 may select an avalanche photodiode (APD) and may also select a PIN photodiode.

If a detection signal sent by a transmitter 3 in the local BOSA encounters an obstacle point in a process of being output from the optical fiber 1, Fresnel reflection occurs and the detection signal is returned to the local BOSA. A Fresnel reflection signal returned due to occurrence of the Fresnel reflection enters the local BOSA through the first end 73a of the third optical path 73. After the detection signal is output from the second end 73b of the third optical path 73, because the WDM optical filter 6 has a reflection effect on the Fresnel reflection signal (whose wavelength is the same as that of the detection signal), the Fresnel reflection signal is reflected by the WDM optical filter 6 and enters the second end 71b of the first optical path 71. The coupler structure formed by the crossing of the first optical path 71 and the second optical path 72 has a splitting effect, and therefore, the Fresnel reflection signal input from the second end 71b of the first optical path 71 can be output from the first end 71a of the first optical path 71 and the first end 72a of the second optical path 72 separately. As described in the foregoing, the coupler formed through the first optical path 71 and the second optical path 72 may be set with a proper splitting ratio, and therefore, a small part of the Fresnel reflection signal can be output from the first end 72a of the second optical path 72 and be received by the OTDR receiver 4 that is connected to the first end 72a of the second optical path 72. The OTDR receiver 4 may select an APD and may also select a PIN.

When the line of the optical fiber 1 works normally, the BOSAs used in pairs send a first communication signal to each other separately through the optical fiber 1, where the first communication signal is transmitted by the local transmitter 3. When a failure occurs in the line of the optical fiber 1, a transmitter 3 in any one of the two BOSAs used in pairs may be adopted to transmit a detection signal. After the detection signal encounters an obstacle point in the line of the optical fiber 1, Fresnel reflection occurs and the detection signal is returned to the BOSA and is received by the OTDR receiver 4 in the BOSA. The OTDR receiver 4 in the BOSA may judge and locate a failure such as disconnection or poor connection of a link according to the size of a received Fresnel reflection signal.

With the bi-direction optical sub-assembly provided in this embodiment of the present invention, a transmitter that transmits a communication signal and a detection signal and a receiver that receives a communication signal and a detection signal are disposed in the bi-direction optical sub-assembly. An OTDR is integrated in a BOSA through a planar lightwave circuit PLC. Therefore, stability of the bi-direction optical sub-assembly is improved, so as to facilitate encapsulation of an optical transceiver.

Figure 4:
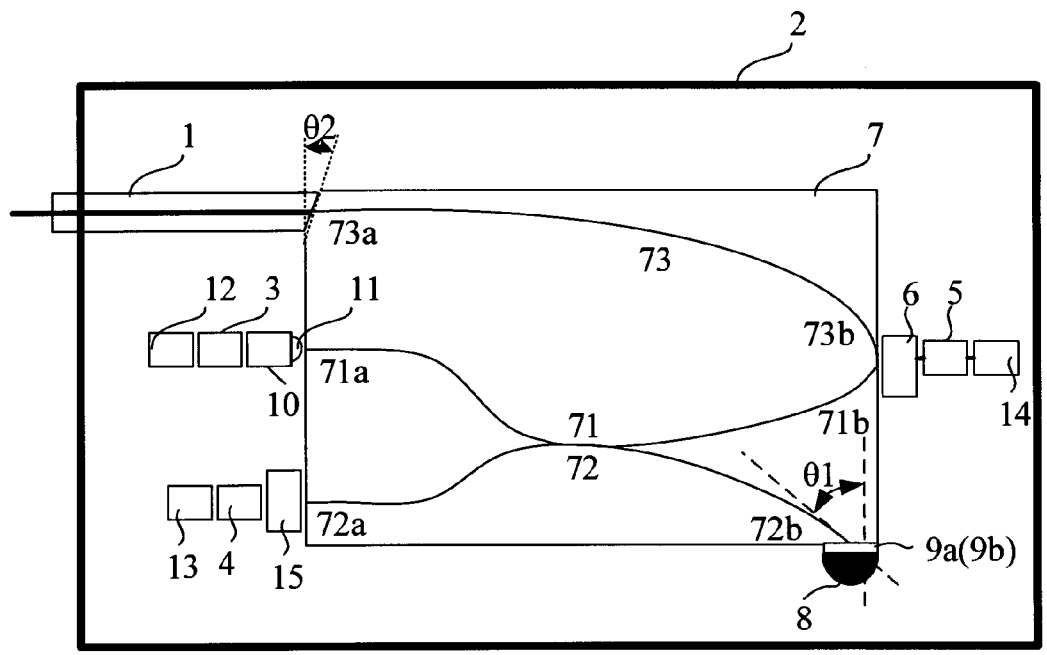
FIG. 4 is a schematic structural diagram of a bi-direction optical sub-assembly according to another embodiment of the present invention.

FIG. 4 is a schematic structural diagram of a bi-direction optical sub-assembly according to another embodiment of the present invention. As shown in FIG. 4, in the bi-direction optical sub-assembly provided in this embodiment, a second end 72b of a second optical path 72 and a second end 71b of a first optical path 71 may coincide, so that the first optical path 71 and the second optical path 72 cross to form a Y-branch coupler structure; or a second end 72b of the second optical path 72 may be located at the edge of a PLC 7, so that the first optical path 71 and the second optical path 72 cross to form an X-branch coupler structure.

As an exemplary embodiment, a first set angle may exist between a waveguide direction of the second end 72b of the second optical path 72 and a normal of a light emitting end surface, so as to avoid that reflected light of emergent light at the second end 72b of the second optical path 72 is returned to the second end 72b of the second optical path 72.

Further, a light-absorbing material 8 may be disposed on a location where the second end 72b of the second optical path 72 is connected to the edge of the PLC 7, so as to avoid that the reflected light of the emergent light at the second end 72b of the second optical path 72 is returned to the second end 72b of the second optical path 72.

Further, an anti-reflection film 9a or a refractive index matching material 9b may be disposed on the location where the second end 72b of the second optical path 72 is connected to the edge of the PLC 7 and is configured to increase transmittance of the emergent light at the second end 72b of the second optical path.

In addition, a first end 73a of a third optical path 73 may be connected to the edge of the PLC 7, a second set angle may exist between a waveguide direction of the first end 73a of the third optical path 73 and a normal of a light emitting end surface, so as to avoid that reflected light of emergent light at the first end 73a of the third optical path 73 is returned to the first end 73a of the third optical path 73.

Further, an isolator 10 may be disposed between a transmitter 3 and a first end 71a of the first optical path 71, and the isolator 10 is configured to prevent a signal that is transmitted by the transmitter 3 from being returned to the transmitter 3.

Further, a lens 11 may be disposed between the isolator 10 and the first end 71a of the first optical path 71, and the lens 11 is configured to focus the signal that is transmitted by the transmitter 3.

One side of the transmitter 3 back to the first optical path 71 is further connected to a monitor photodiode MPD 12, which is configured to monitor a signal sent from the side of the transmitter 3 back to the first optical path 71.

The bi-direction optical sub-assembly provided in this embodiment may further include: a first transimpedance amplifier (TIA) 13 that is connected to an OTDR receiver 4 and is configured to convert a current signal received by the OTDR receiver into a voltage signal; and/or a second transimpedance amplifier (TIA) 14 that is connected to a BOSA receiver 5 and is configured to convert a current signal received by the BOSA receiver 5 into a voltage signal.

Further, a cutoff optical filter 15 may be disposed between the OTDR receiver 4 and a first end 72a of the second optical path 72, and the cutoff optical filter 15 is configured to isolate a second communication signal that is not transmitted by a WDM optical filter 6 completely.

Specifically, in order to prevent a first communication signal or a detection signal transmitted by the transmitter 3 from being returned to the transmitter 3, the isolator 10 may be disposed between the transmitter 3 and the first end 71a of the first optical path 71, so as to prevent a signal that is sent by the transmitter 3 from being reflected back to the transmitter 3.

In addition, in order to improve transmission efficiency of the transmitter 3, signals transmitted by the transmitter 3 are centralized. The lens 11 may further be disposed between the isolator 10 and the first end 71a of the first optical path 71, so that an optical signal sent by the transmitter 3, after passing through the isolator 10, can be focused and input to the first end 71a of the first optical path 71 under an effect of the lens 11.

As a feasible implementation manner, a monitor photodiode 12 (MPD) may be connected to one side of the transmitter 3 back to the first optical path 71, so as to monitor a backward light emitting condition of the transmitter 3.

A first communication signal or a detection signal sent by the transmitter 3 is input from the first end 71a of the first optical path 71. By setting a distance between the first optical path 71 and the second optical path 72 in a coupling area, a crossing length or coincidence length, and the thickness of a waveguide of the first optical path 71 and/or the second optical path 72, a coupling structure formed by the first optical path 71 and the second optical path 72 has a proper splitting ratio. Accordingly, most of the light input from the first end 71a of the first optical path 71 is output from the second end 71b of the first optical path 71 to the WDM optical filter 6, and only a small part of the light is output from the second end 72b of the second optical path 72. The WDM optical filter 6 has a reflection effect on light of a wavelength of a first communication signal or a detection signal sent by a local transmitter 3. Therefore, a first communication signal or a detection signal output from the second end 71b of the first optical path 71, under reflection of the WDM optical filter 6, is input to a second end 73b of the third optical path 73 and enters an optical fiber 1 through the first end 73a of the third optical path 73.

After a second communication signal that is transmitted by another BOSA and is received from the optical fiber 1 enters a local BOSA from the first end 73a of the third optical path 73, for the second communication signal output from the second end 73b of the third optical path 73, because the WDM optical filter 6 has a transmission effect on a wavelength of the second communication signal, the second communication signal is received by the BOSA receiver 5 through transmission of the WDM optical filter 6. The second communication signal received by the BOSA receiver 5 is usually a current signal, and compared with a voltage signal, the current signal is uneasy to be processed. Therefore, the BOSA receiver 5 may further be connected to a second transimpedance amplifier (TIA) 14, where the second transimpedance amplifier is configured to convert a current signal received by the BOSA receiver 5 into a voltage signal.

If a detection signal sent by a transmitter 3 in the local BOSA, in a process of being output from the optical fiber 1, encounters an obstacle point, Fresnel reflection occurs and the detection signal is returned to the local BOSA through the first end 73a of the third optical path 73. After a Fresnel reflection signal is output from the second end 73b of the third optical path 73, because the WDM optical filter 6 has a reflection effect on the Fresnel reflection signal (whose wavelength is the same as that of the detection signal), the Fresnel reflection signal is reflected by the WDM optical filter 6 and enters the second end 71b of the first optical path 71. Under a coupler structure formed by the first optical path 71 and the second optical path 72, the Fresnel reflection signal is output from the first end 71a of the first optical path 71 and the first end 72a of the second optical path 72 separately. The Fresnel reflection signal output from the first end 71a of the first optical path 71 may be isolated by the isolator 10. The Fresnel reflection signal output from the first end 72a of the second optical path 72 is received by the OTDR receiver 4. Under an effect of the cutoff optical filter 15 that is disposed between the first end 72a of the second optical path 72 and the OTDR receiver 4, only light of the wavelength of the Fresnel reflection signal of the detection signal is allowed to pass, so that a small part of the second communication signal that is not transmitted by the WDM optical filter completely may be isolated again. The detection signal received by the OTDR receiver 4 is usually a current signal. Therefore, the OTDR receiver 4 may further be connected to a first TIA 13, where the first TIA 13 is configured to convert a current signal received by the OTDR receiver 4 into a voltage signal.

Figure 5:
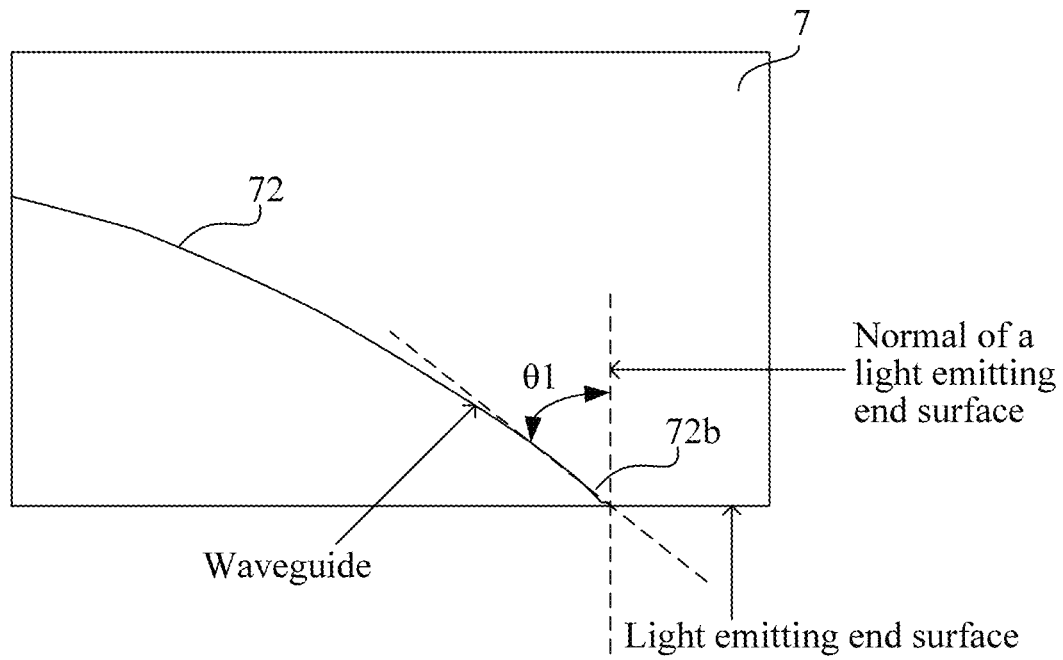
FIG. 5 is a partial enlargement diagram of a second end of a second optical path and the edge of a PLC according to an embodiment of the present invention.

To further reduce crosstalk of an optical path, a first set angle $\theta_1$ may exist between a waveguide direction of a second end 72b of a second optical path 72 and a normal of a light emitting end surface. FIG. 5 is a partial enlargement diagram of a second end 72b of a second optical path 72 and the edge of a PLC 7. The first set angle $\theta_1$ is set to avoid that reflected light of emergent light at the second end 72b of the second optical path 72 is returned to the second end 72b of the second optical path 72.

Further, a light-absorbing material 8 may be disposed on a location where the second end 72b of the second optical path 72 is connected to the edge of the PLC 7, so as to avoid that the reflected light of the emergent light at the second end 72b of the second optical path 72 is returned to the second end 72b of the second optical path 72. An anti-reflection film 9a or a refractive index matching material 9b may further be disposed on the location where the second end 72b of the second optical path 72 is connected to the edge of the PLC 7, so as to increase transmittance of the emergent light at the second end 72b of the second optical path 72. This ensures that most of an optical signal sent from the second end 72b of the second optical path 72 is refracted out from the edge of the PLC 7 and is not returned to the second end 72b of the second optical path 72, thereby ensuring that a transmitter 3 has little crosstalk on an OTDR receiver 4 and ensuring that the OTDR receiver 4 has high receiving sensitivity.

Figure 6:
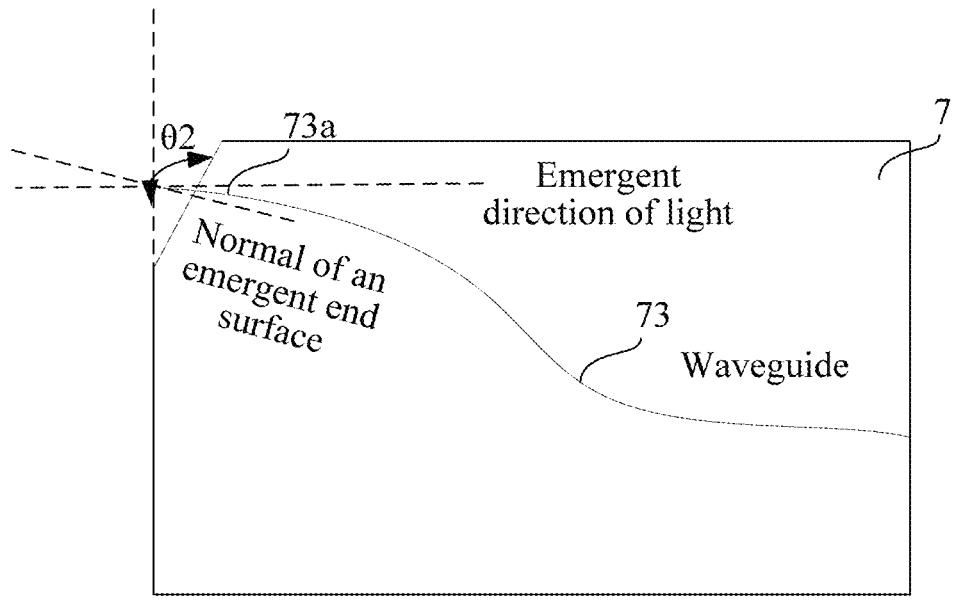
FIG. 6 is a partial enlargement diagram of a first end of a third optical path and the edge of a PLC according to an embodiment of the present invention.

Similarly, a first end 73a of a third optical path 73 may be connected to the edge of a PLC 7, and a second set angle $\theta_2$ may exist between a waveguide direction of the first end 73a of the third optical path 73 and a normal of a light emitting end surface. FIG. 6 is a partial enlargement diagram of a first end 73a of a third optical path 73 and the edge of a PLC 7. The second set angle $\theta_2$ is set to avoid that reflected light of emergent light at the first end 73a of the third optical path 73 is returned to the first end 73a of the third optical path 73, thereby avoiding crosstalk of a first communication signal or a detection signal on a signal received by an OTDR receiver, where the first communication signal or the detection signal is sent by a transmitter 3.

An embodiment of the present invention further provides an optical transceiver, which includes a peripheral circuit and a bi-direction optical sub-assembly.

The bi-direction optical sub-assembly is connected to an optical fiber and specifically includes a case body, where a transmitter, an optical time-domain reflectometer OTDR receiver, a bi-direction optical sub-assembly BOSA receiver, a wavelength division multiplexing WDM optical filter, and a planar lightwave circuit PLC are disposed in an inner cavity of the case body.

A first optical path and a second optical path are disposed on the PLC, where the first optical path and the second optical path cross to form a coupler structure, where a first end of the first optical path is connected to the transmitter, and where a second end of the first optical path is connected to the WDM optical filter. A first end of the second optical path is connected to the OTDR receiver. A third optical path is further disposed on the PLC, where a first end of the third optical path is connected to the optical fiber, and where a second end of the third optical path is connected to the second end of the first optical path. The WDM optical filter is connected to the BOSA receiver.

The transmitter is configured to transmit a first communication signal or a detection signal, where the first communication signal or the detection signal is input from the first end of the first optical path and output from the second end of the first optical path, enters the second end of the third optical path through reflection of the WDM optical filter, and is input to the optical fiber from the first end of the third optical path.

A second communication signal received by the optical fiber is input from the first end of the third optical path and output from the second end of the third optical path, and the second communication signal is received by the BOSA receiver through transmission of the WDM optical filter. A Fresnel reflection signal returned due to occurrence of Fresnel reflection when the detection signal encounters an obstacle point in the optical fiber is input from the first end of the third optical path and output from the second end of the third optical path, is input to the second end of the first optical path through reflection of the WDM optical filter, and after being output from the first end of the second optical path, is received by the OTDR receiver.

The optical transceiver provided in this embodiment of the present invention may specifically be an OLT, an ONU, or an ONT in a PON. For a specific structure and function of the bi-direction optical sub-assembly, reference may be made to the bi-direction optical sub-assembly embodiment provided in the present invention, which are not described again.

The BOSA in the optical transceiver provided in this embodiment may be integrated with a function of the OTDR, improves stability of the bi-direction optical sub-assembly and the optical transceiver, and has advantages that volume is small and encapsulation is easy.

Finally, it should be noted that the foregoing embodiments are merely provided for describing the technical solutions of the present invention, but are not intended to limit the present invention. It should be understood by persons skilled in the art that although the present invention is described in detail with reference to the foregoing embodiments, modifications may still be made to the technical solutions described in each of the embodiments, or equivalent replacements may be made to some technical features in the technical solution, as long as such modifications or replacements do not cause the essence of corresponding technical solutions to depart from the spirit and scope of the technical solutions in each of the embodiments of the present invention.

What is claimed is:

1. A bi-direction optical sub-assembly, connected to an optical fiber, comprising:
   a case body, wherein a transmitter, an optical time-domain reflectometer (OTDR) receiver, a bi-direction optical sub-assembly (BOSA) receiver, a wavelength division multiplexing (WDM) optical filter, and a planar lightwave circuit (PLC) are disposed in an inner cavity of the case body,
   wherein a first optical path and a second optical path are disposed on the PLC,
   wherein the first optical path and the second optical path cross to form a coupler structure,
   wherein a first end of the first optical path is connected to the transmitter, and a second end of the first optical path is connected to the WDM optical filter,
   wherein a first end of the second optical path is connected to the OTDR receiver,
   wherein a third optical path is further disposed on the PLC,
   wherein a first end of the third optical path is connected to the optical fiber, and a second end of the third optical path is connected to the second end of the first optical path,
   wherein the WDM optical filter is connected to the BOSA receiver,
   wherein the transmitter is configured to transmit a first communication signal or a detection signal,
   wherein the first communication signal or the detection signal is input from the first end of the first optical path, is output from the second end of the first optical path, enters the second end of the third optical path through reflection of the WDM optical filter, and is input to the optical fiber from the first end of the third optical path,
   wherein a second communication signal received by the optical fiber is input from the first end of the third optical path, is output from the second end of the third optical path, and is received by the BOSA receiver through transmission of the WDM optical filter,
   wherein a Fresnel reflection signal returned due to occurrence of Fresnel reflection when the detection signal encounters an obstacle point in the optical fiber is input from the first end of the third optical path, is output from the second end of the third optical path, is input to the second end of the first optical path through reflection of the WDM optical filter, and after being output from the first end of the second optical path, is received by the OTDR receiver,
   wherein a cutoff optical filter is further disposed between the OTDR receiver and the first end of the second optical path, and
   wherein the cutoff optical filter is configured to isolate the second communication signal that is not transmitted by the WDM optical filter completely.

2. The bi-direction optical sub-assembly according to claim 1, wherein a second end of the second optical path and the second end of the first optical path coincide such that the first optical path and the second optical path form a Y-branch coupler structure, or wherein a second end of the second optical path is located at the edge of the PLC such that the first optical path and the second optical path form an X-branch coupler structure.

3. A bi-direction optical sub-assembly, connected to an optical fiber, comprising:
   a case body, wherein a transmitter, an optical time-domain reflectometer (OTDR) receiver, a bi-direction optical sub-assembly (BOSA) receiver, a wavelength division multiplexing (WDM) optical filter, and a planar lightwave circuit (PLC) are disposed in an inner cavity of the case body, wherein a first optical path and a second optical path are disposed on the PLC, wherein the first optical path and the second optical path cross to form a coupler structure, wherein a first end of the first optical path is connected to the transmitter, and a second end of the first optical path is connected to the WDM optical filter, wherein a first end of the second optical path is connected to the OTDR receiver, wherein a third optical path is further disposed on the PLC, wherein a first end of the third optical path is connected to the optical fiber, and a second end of the third optical path is connected to the second end of the first optical path, wherein the WDM optical filter is connected to the BOSA receiver, wherein the transmitter is configured to transmit a first communication signal or a detection signal, wherein the first communication signal or the detection signal is input from the first end of the first optical path, is output from the second end of the first optical path, enters the second end of the third optical path through reflection of the WDM optical filter, and is input to the optical fiber from the first end of the third optical path, wherein a second communication signal received by the optical fiber is input from the first end of the third optical path, is output from the second end of the third optical path, and is received by the BOSA receiver through transmission of the WDM optical filter, wherein a Fresnel reflection signal returned due to occurrence of Fresnel reflection when the detection signal encounters an obstacle point in the optical fiber is input from the first end of the third optical path, is output from the second end of the third optical path, is input to the second end of the first optical path through reflection of the WDM optical filter, and after being output from the first end of the second optical path, is received by the OTDR receiver, wherein a second end of the second optical path and the second end of the first optical path coincide such that the first optical path and the second optical path form a Y-branch coupler structure, or wherein a second end of the second optical path is located at the edge of the PLC such that the first optical path and the second optical path form an X-branch coupler structure, and wherein a first set angle exists between a waveguide direction of the second end of the second optical path and a normal of a light emitting end surface.

4. The bi-direction optical sub-assembly according to claim 3, wherein a light-absorbing material is further disposed on a location where the second end of the second optical path is connected to the edge of the PLC.

5. The bi-direction optical sub-assembly according to claim 3, wherein an anti-reflection film or a refractive index matching material is further disposed on the location where the second end of the second optical path is connected to the edge of the PLC, and wherein the anti-reflection film or the refractive index matching material is configured to increase transmittance of the emergent light at the second end of the second optical path.

6. The bi-direction optical sub-assembly according to claim 1, wherein the first end of the third optical path is connected to the edge of the PLC, and a second set angle exists between a waveguide direction of the first end of the third optical path and a normal of a light emitting end surface.

7. The bi-direction optical sub-assembly according to claim 1, wherein an isolator is further disposed between the transmitter and the first end of the first optical path, and wherein the isolator is configured to prevent a signal that is transmitted by the transmitter from being returned to the isolator.

8. The bi-direction optical sub-assembly according to claim 7, wherein a lens is further disposed between the isolator and the first end of the first optical path, and wherein the lens is configured to focus the signal that is transmitted by the transmitter.

9. The bi-direction optical sub-assembly according to claim 1, wherein one side of the transmitter back to the first optical path is further connected to a monitor photodiode (MPD), and wherein the MPD is configured to monitor a signal sent from the side of the transmitter back to the first optical path.

10. The bi-direction optical sub-assembly according to claim 1, further comprising:
a first transimpedance amplifier (TIA) that is connected to the OTDR receiver and that is configured to convert a current signal that is received by the OTDR receiver into a voltage signal; and/or
a second TIA that is connected to the BOSA receiver and that is configured to convert a current signal that is received by the BOSA receiver into a voltage signal.

11. An optical transceiver comprising:
a peripheral circuit; and
a bi-direction optical sub-assembly that is connected to an optical fiber and that includes a case body, wherein a transmitter, an optical time-domain reflectometer (OTDR) receiver, a bi-direction optical sub-assembly (BOSA) receiver, a wavelength division multiplexing (WDM) optical filter, and a planar lightwave circuit (PLC) are disposed in an inner cavity of the case body, wherein a first optical path and a second optical path are disposed on the PLC, wherein the first optical path and the second optical path cross to form a coupler structure, wherein a first end of the first optical path is connected to the transmitter, and a second end of the first optical path is connected to the WDM optical filter, wherein a first end of the second optical path is connected to the OTDR receiver, wherein a third optical path is further disposed on the PLC, wherein a first end of the third optical path is connected to the optical fiber, and a second end of the third optical path is connected to the second end of the first optical path, wherein the WDM optical filter is connected to the BOSA receiver, wherein the transmitter is configured to transmit a first communication signal or a detection signal, wherein the first communication signal or the detection signal is input from the first end of the first optical path, is output from the second end of the first optical path, enters the second end of the third optical path through reflection of the WDM optical filter, and is input to the optical fiber from the first end of the third optical path, wherein a second communication signal received by the optical fiber is input from the first end of the third optical path, is output from the second end of the third optical path, and is received by the BOSA receiver through transmission of the WDM optical filter, wherein a Fresnel reflection signal returned due to occurrence of Fresnel reflection when the detection signal encounters an obstacle point in the optical fiber is input from the first end of the third optical path, is output from the second end of the third optical path, is input to the second end of the first optical path through reflection of the WDM optical filter, and after being output from the first end of the second optical path, is received by the OTDR receiver, wherein a cutoff optical filter is further disposed between the OTDR receiver and the first end of the second optical path, and wherein the cutoff optical filter is configured to isolate the second communication signal that is not transmitted by the WDM optical filter completely.

12. The bi-direction optical sub-assembly according to claim 11, wherein a second end of the second optical path and the second end of the first optical path coincide such that the first optical path and the second optical path form a Y-branch coupler structure, or wherein a second end of the second optical path is located at the edge of the PLC such that the first optical path and the second optical path form an X-branch coupler structure.

13. An optical transceiver comprising:
a peripheral circuit; and
a bi-direction optical sub-assembly that is connected to an optical fiber and that includes a case body, wherein a transmitter, an optical time-domain reflectometer (OTDR) receiver, a bi-direction optical sub-assembly (BOSA) receiver, a wavelength division multiplexing (WDM) optical filter, and a planar lightwave circuit (PLC) are disposed in an inner cavity of the case body, wherein a first optical path and a second optical path are disposed on the PLC, wherein the first optical path and the second optical path cross to form a coupler structure, wherein a first end of the first optical path is connected to the transmitter, and a second end of the first optical path is connected to the WDM optical filter, wherein a first end of the second optical path is connected to the OTDR receiver, wherein a third optical path is further disposed on the PLC,
wherein a first end of the third optical path is connected to the optical fiber, and a second end of the third optical path is connected to the second end of the first optical path, wherein the WDM optical filter is connected to the BOSA receiver, wherein the transmitter is configured to transmit a first communication signal or a detection signal, wherein the first communication signal or the detection signal is input from the first end of the first optical path, is output from the second end of the first optical path, enters the second end of the third optical path through reflection of the WDM optical filter, and is input to the optical fiber from the first end of the third optical path, wherein a second communication signal received by the optical fiber is input from the first end of the third optical path, is output from the second end of the third optical path, and is received by the BOSA receiver through transmission of the WDM optical filter, wherein a Fresnel reflection signal returned due to occurrence of Fresnel reflection when the detection signal encounters an obstacle point in the optical fiber is input from the first end of the third optical path, is output from the second end of the third optical path, is input to the second end of the first optical path through reflection of the WDM optical filter, and after being output from the first end of the second optical path, is received by the OTDR receiver, wherein a second end of the second optical path and the second end of the first optical path coincide such that the first optical path and the second optical path form a Y-branch coupler structure, or wherein a second end of the second optical path is located at the edge of the PLC such that the first optical path and the second optical path form an X-branch coupler structure, and wherein a first set angle exists between a waveguide direction of the second end of the second optical path and a normal of a light emitting end surface.

14. The bi-direction optical sub-assembly according to claim 13, wherein a light-absorbing material is further disposed on a location where the second end of the second optical path is connected to the edge of the PLC.

15. The bi-direction optical sub-assembly according to claim 13, wherein an anti-reflection film or a refractive index matching material is further disposed on the location where the second end of the second optical path is connected to the edge of the PLC and is configured to increase transmittance of the emergent light at the second end of the second optical path.

16. The bi-direction optical sub-assembly according to claim 11, wherein the first end of the third optical path is connected to the edge of the PLC, and a second set angle exists between a waveguide direction of the first end of the third optical path and a normal of a light emitting end surface.

17. The bi-direction optical sub-assembly according to claim 11, wherein an isolator is further disposed between the transmitter and the first end of the first optical path, and wherein the isolator is configured to prevent a signal that is transmitted by the transmitter from being returned to the isolator.

18. The bi-direction optical sub-assembly according to claim 17, wherein a lens is further disposed between the isolator and the first end of the first optical path, and wherein the lens is configured to focus the signal that is transmitted by the transmitter.

19. The bi-direction optical sub-assembly according to claim 11, wherein one side of the transmitter back to the first optical path is further connected to a monitor photodiode (MPD), and wherein the MPD is configured to monitor a signal sent from the side of the transmitter back to the first optical path.

20. The bi-direction optical sub-assembly according to claim 11, further comprising:
a first transimpedance amplifier (TIA) that is connected to the OTDR receiver and is configured to convert a current signal that is received by the OTDR receiver into a voltage signal; and/or
a second TIA that is connected to the BOSA receiver and is configured to convert a current signal that is received by the BOSA receiver into a voltage signal.

* * * * *